Patented Mar. 20, 1928.

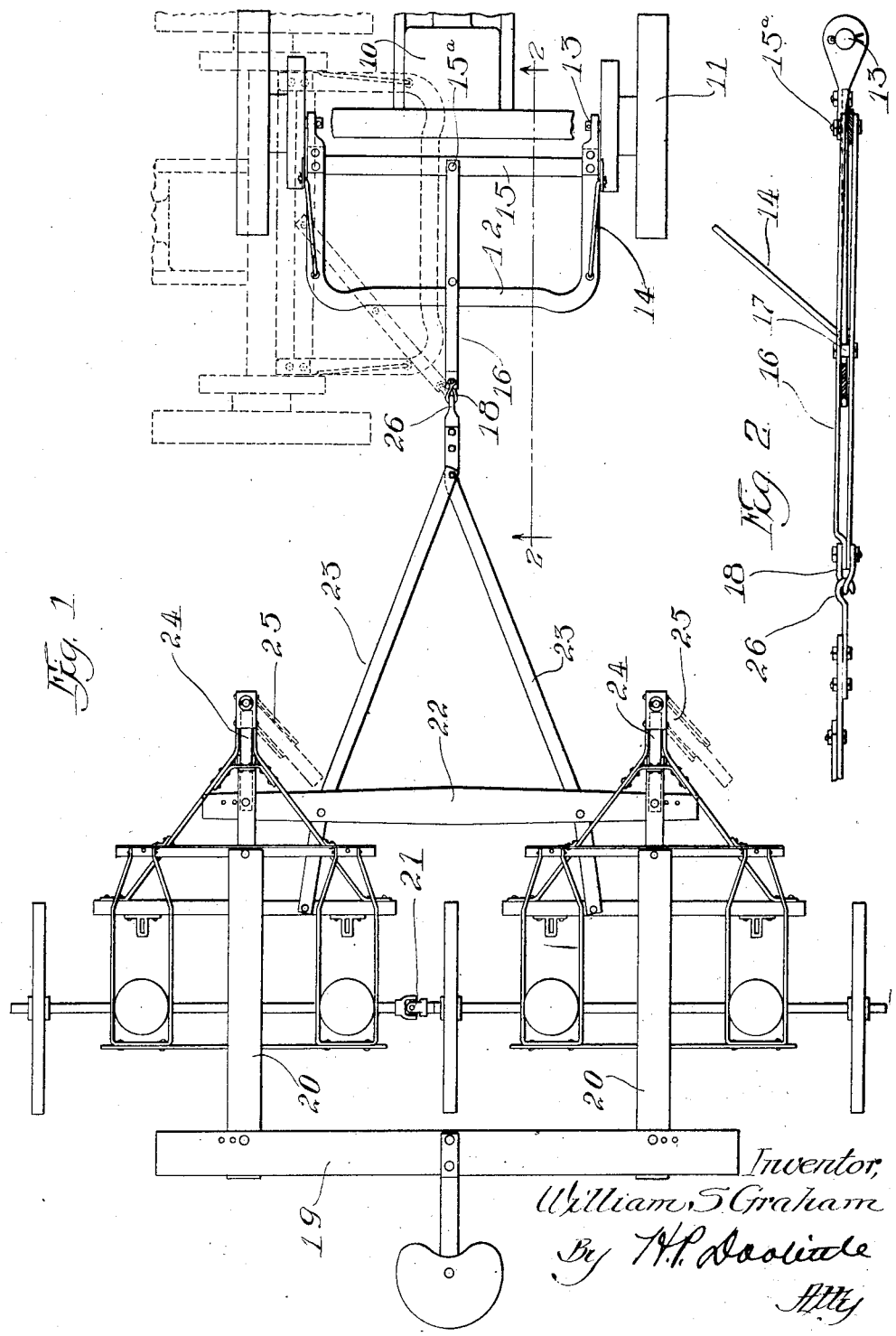

1,663,250

UNITED STATES PATENT OFFICE.

WILLIAM S. GRAHAM, OF CANTON, ILLINOIS, ASSIGNOR TO INTERNATIONAL HARVESTER COMPANY, A CORPORATION OF NEW JERSEY.

TRACTOR HITCH.

Application filed August 6, 1926. Serial No. 127,545.

This invention relates to means for coupling certain types of farm implements to a draft vehicle or tractor. The principal purpose of the invention is to provide a simple form of draft coupling or hitch construction that will permit connection of a wheel supported implement with the rear of a tractor in a manner to efficiently transmit the draft and also give an arrangement having the necessary flexibility for short turns of the tractor and implement. Further objects are, to provide a hitch affording ample space between the tractor and the attached implement and that will avoid fouling between the implement and tractor wheels on short turns and support the hitch members so that they will remain in operative position when not subject to the pull of the tractor. Minor objects will become apparent as the specific description of the structure illustrating a preferred embodiment of the invention is read.

Referring to the drawings,—

Fig. 1 is a plan view showing a multiple row planter coupled to the rear of a tractor by structure embodying the novel features of the invention, parts of the tractor axle being broken away to show underlying parts; and Fig. 2 is a detail side view on line 2—2 of Fig. 1 showing certain parts of the hitch on an enlarged scale.

The preferred construction is herein disclosed in connection with the rear portion and axle structure of a tractor 10 which is supported on traction wheels 11. The tractor is of the wide tread arched rear axle type. Between the rear wheels of the tractor there is mounted a horizontally positioned arched or U-shaped bar 12 the arch portion of which extends rearwardly of the wheels and arms of which extend forwardly within the arch of the tractor axle and are supported at their ends on pintles 13 on the inner sides of the axle structure. Supporting rods 14 connect the axle structure of the tractor with the arched bar 12 and hold it in desired position the points of connection between these rods and the arched bar being on the inner ends of the arms of the arch where they join the bight portion or cross piece of the arch. The forward ends of the arms of bar 12 are connected by a transverse draft bar 15 at the middle of which there is pivoted at 15ᵃ a draft link 16 preferably composed of twin bars spaced sufficiently to enclose the cross bar 15 and arch bar 12 on which it rests, as shown by Fig. 2. Preferably, a suitable spacing bolt and sleeve 17 is provided at the middle of the draft link 16. The rear end of link 16 carries a clevis 18, and projects beyond the arch of bar 12 so that its end moves through an arc substantially as long as the space between the tractor wheels.

The hitch structure above described is particularly adapted for use in combination with farm implements of the class having wheel supported frames and which are equipped with forward supporting means having a draft frame designed to cooperate with the draft gear just described. In the present instance the implement shown consists of two two-row planters of well known type which have been connected to form a unit by means of a transverse beam 19 at the rear which is secured to the rear ends of longitudinal beams 20 on each of the planters. Preferably, the axles of the planters are joined at their inner ends by a universal joint 21 and the inner wheel of one of the planters is eliminated. The draft frame for the united planters consists of a transverse beam or member 22 connecting the front ends of the planter frames, long forwardly converging tongue bars 23 secured at their rear ends to the beam 22 and to each of the planter frames, and stub poles 24 replacing the usual tongues and supported at their forward ends on caster wheels 25. The united forward ends of the tongue bars 23 are provided with means such as a hook 26 for engaging the clevis 18.

The organization described affords a draft connection having two longitudinally aligned vertical pivotal points, that at 15ᵃ and that at the clevis 18, and one in which part of the connecting elements, link 16 and bar 12 on which it moves, are so supported as to have no free vertical movement. The relative positions of the pivots are such that the tractor may turn at right angles to the implement being drawn, as indicated in dotted lines on Fig. 1, and do so without fouling the implement or any part of the draft rigging as the implement is brought sufficiently to the rear of the tractor by the links 23 to obviate contact and as the lower ends of rods 14 operate as stops to prevent excessive movement of link 16. On a short turn the casters 25 supporting the forward positions of the implement permit easy trailing.

The novel structure described is capable of certain modifications without departure from the gist of the invention as defined in the following claims.

What is claimed as new is:

1. A draft device comprising the combination with a tractor of a horizontally positioned arched member comprising a flat bar having parallel arms connected to the tractor on horizontal pintles and its arch extending back of the tractor wheels, supporting links connecting the arched member with the tractor at desired elevation, a longitudinally extending draft link supported intermediate its ends on said arch for lateral movement limited by said supporting links, and pivotal supporting means for the draft link located midway between the arms of said arched member.

2. A draft device comprising the combination with a tractor of a horizontally positioned arched member having parallel arms connected to the tractor on horizontal pintles and its arch extending back of the tractor wheels, suspension means for supporting said member, a cross-bar connecting the ends of said arms, a draft link pivoted on the cross-bar midway between the arms for lateral movement and resting on the arch of the arched member, and stops on opposite sides of said arch limiting the range of movement of the draft link.

3. In draft gear for connecting a tractor and vehicle, the combination of a horizontally positioned rearwardly extending frame mounted on the tractor, a longitudinally extending laterally swingable draft link supported between its ends on said frame, a rigid forwardly extending draft frame secured to the vehicle and pivotally connected to said link, a cross-member on the draft frame, and a caster wheel support for said cross-member having bearing means projected in advance of said member.

4. A tractor hitch comprising a U-shaped member having parallel arms adapted for attachment to a tractor on horizontally extending bearings, a draft link extending across the bight portion of said member and freely movable thereon, said link comprising spaced bars enclosing said portion of the U-bar, and a cross-bar connecting the ends of the U-bar arms and to which the forward end of said draft link is pivoted at a point midway between said arms.

In testimony whereof I affix my signature.

WILLIAM S. GRAHAM.